(12) United States Patent
Jindal et al.

(10) Patent No.: US 10,953,833 B2
(45) Date of Patent: Mar. 23, 2021

(54) AIRBAG WITH BREAKABLE BAND

(71) Applicant: Ford Global Technologies, LLC, Dearborn, MI (US)

(72) Inventors: Pardeep Kumar Jindal, Canton, MI (US); Rahul Makwana, Dearborn Heights, MI (US); Srinivas Reddy Malapati, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 16/379,200

(22) Filed: Apr. 9, 2019

(65) Prior Publication Data

US 2020/0324725 A1 Oct. 15, 2020

(51) Int. Cl.
| | |
|---|---|
| *B60R 21/2338* | (2011.01) |
| *B60R 21/205* | (2011.01) |
| *B60R 21/201* | (2011.01) |
| *B60R 21/16* | (2006.01) |
| *B60R 21/239* | (2006.01) |

(52) U.S. Cl.
CPC ........ *B60R 21/201* (2013.01); *B60R 21/2338* (2013.01); *B60R 21/205* (2013.01); *B60R 21/239* (2013.01); *B60R 2021/161* (2013.01); *B60R 2021/23386* (2013.01)

(58) Field of Classification Search
CPC .............. B60R 21/201; B60R 21/2338; B60R 2021/23382; B60R 21/205; B60R 2021/161; B60R 2021/23388; B60R 2021/23386
See application file for complete search history.

(56) References Cited

U.S. PATENT DOCUMENTS

| | | | | |
|---|---|---|---|---|
| 3,861,744 A | * | 1/1975 | Yamada ................... | B60R 22/16 297/472 |
| 4,887,842 A | * | 12/1989 | Sato ....................... | B60R 21/233 280/730.1 |
| 5,308,113 A | * | 5/1994 | Moriset ................. | B60R 21/233 280/743.2 |
| 5,362,101 A | * | 11/1994 | Sugiura ................. | B60R 21/233 280/728.2 |
| 5,678,858 A | * | 10/1997 | Nakayama ............ | B60R 21/233 280/728.2 |
| 5,765,867 A | | 6/1998 | French | |
| 5,997,037 A | * | 12/1999 | Hill ....................... | B60R 21/201 280/728.1 |
| 6,254,130 B1 | * | 7/2001 | Jayaraman ............ | B60R 21/233 280/731 |
| 6,572,144 B2 | * | 6/2003 | Igawa ................... | B60R 21/233 280/743.1 |

(Continued)

*Primary Examiner* — Karen Beck
(74) *Attorney, Agent, or Firm* — Frank A. MacKenzie; Bejin Bieneman PLC

(57) ABSTRACT

A restraint system includes a housing, an airbag, and a band. The airbag is inflatable from an uninflated position in the housing to a fully inflated position extending from the housing, and the airbag has a rear panel spaced from the housing when the airbag is in the fully inflated position. The band is elongated from a first end to a second end, and the first and second ends are attached to the housing. When the airbag is in a partially inflated position, the band extends across the rear panel and is stretched to a maximum length.

20 Claims, 4 Drawing Sheets

(56) References Cited

U.S. PATENT DOCUMENTS

| | | | |
|---|---|---|---|
| 6,585,292 B2* | 7/2003 | Abe | B60R 21/20 280/728.1 |
| 6,722,691 B1 | 4/2004 | Haland et al. | |
| 6,783,151 B2* | 8/2004 | Rasch | B60R 21/23138 280/729 |
| 6,883,831 B2 | 4/2005 | Hawthorn et al. | |
| 6,981,719 B2* | 1/2006 | Igawa | B60R 21/233 280/743.1 |
| 7,360,790 B2* | 4/2008 | Hasebe | B60R 21/233 280/743.2 |
| 7,377,548 B2 | 5/2008 | Bauer et al. | |
| 7,695,013 B2 | 4/2010 | Kakstis et al. | |
| 7,878,541 B2* | 2/2011 | Bustos Garcia | B60R 21/233 280/743.2 |
| 8,020,889 B2 | 9/2011 | Bauer et al. | |
| 8,272,664 B2 | 9/2012 | Benny et al. | |
| 8,840,140 B2* | 9/2014 | Mendez | B60R 21/2338 280/743.2 |
| 9,027,963 B2* | 5/2015 | Murakami | B60R 21/2338 280/743.2 |
| 2001/0033072 A1* | 10/2001 | Kumagai | B60R 21/231 280/730.1 |
| 2002/0153717 A1* | 10/2002 | Keshavaraj | B60R 21/235 280/743.2 |
| 2003/0230883 A1* | 12/2003 | Heym | B60R 21/2338 280/743.1 |
| 2004/0012180 A1* | 1/2004 | Hawthorn | B60R 21/2338 280/739 |
| 2005/0057030 A1* | 3/2005 | Fischer | B60R 21/2338 280/743.2 |
| 2005/0127653 A1* | 6/2005 | Williams | B60R 21/2338 280/743.2 |
| 2006/0131843 A1 | 6/2006 | Sherwood et al. | |
| 2008/0252054 A1 | 10/2008 | Kim et al. | |
| 2009/0189376 A1* | 7/2009 | Vigeant | B60R 21/233 280/742 |
| 2009/0236839 A1* | 9/2009 | McFadden | B60R 21/2338 280/743.2 |
| 2011/0193328 A1* | 8/2011 | Fukawatase | B60R 21/201 280/730.2 |
| 2014/0091561 A1* | 4/2014 | Fukawatase | B60R 21/205 280/728.3 |
| 2014/0191497 A1* | 7/2014 | Murakami | B60R 21/2338 280/743.2 |
| 2014/0339798 A1* | 11/2014 | Motomochi | B60R 21/231 280/732 |
| 2015/0367802 A1* | 12/2015 | Fukawatase | B60R 21/205 280/732 |
| 2015/0375707 A1* | 12/2015 | Saito | B60R 21/239 280/728.3 |
| 2016/0311392 A1* | 10/2016 | Jindal | B60R 21/231 |
| 2017/0158154 A1* | 6/2017 | Kobayashi | B60R 21/2338 |
| 2017/0274859 A1* | 9/2017 | Heurlin | B60R 21/231 |
| 2018/0056922 A1* | 3/2018 | Yamada | B60R 21/235 |
| 2018/0154857 A1* | 6/2018 | Yamada | B60R 21/231 |
| 2019/0248484 A1* | 8/2019 | Stough | B64C 39/022 |
| 2019/0351862 A1* | 11/2019 | Aranzulla | B60R 21/231 |

* cited by examiner

AIRBAG WITH BREAKABLE BAND

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side curtain airbags mounted in the roof rails.

DETAILED DESCRIPTION

Figure 1:
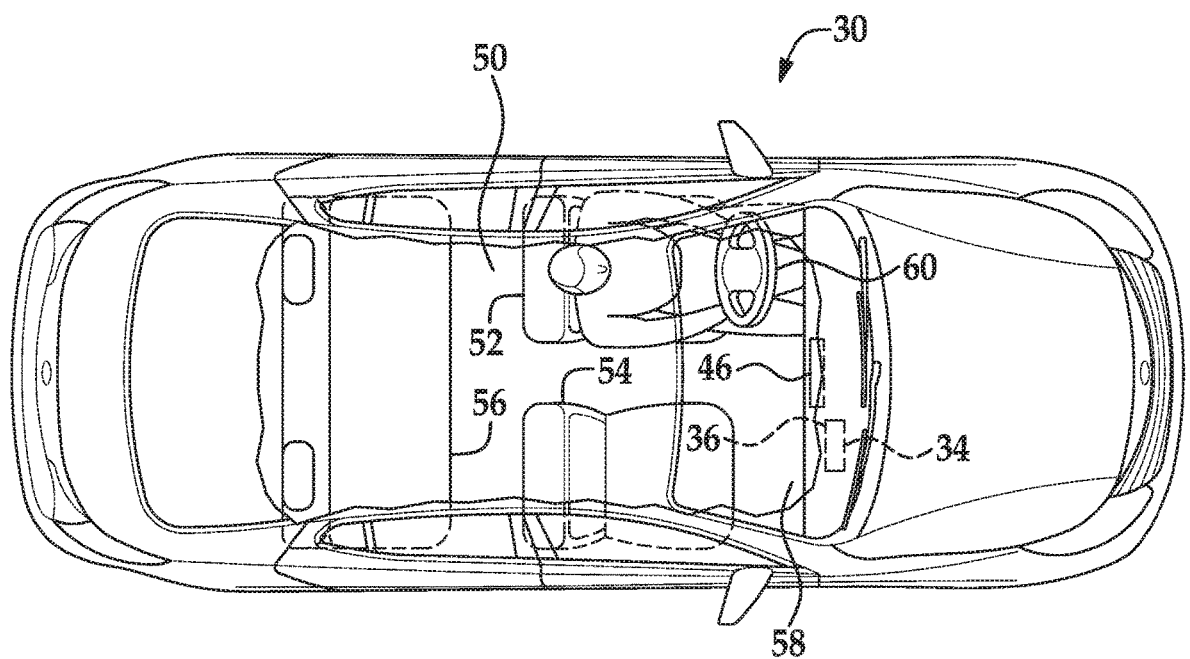
FIG. 1 is a top view of a vehicle with a passenger cabin exposed for illustration.

A restraint system includes a housing, an airbag inflatable from an uninflated position in the housing to a fully inflated position extending from the housing, and a stretchable band elongated from a first end to a second end. The airbag has a rear panel spaced from the housing when the airbag is in the fully inflated position. The first and second ends are attached to the housing. When the airbag is in a partially inflated position, the band extends across the rear panel and is stretched to a maximum length.

A tensile force exerted on the band from inflation of the airbag to the fully inflated position may be greater than a yield force of the band.

The restraint system may further include an instrument panel in which the housing is disposed. The restraint system may further include a display screen extending upward from the instrument panel, and the housing may be disposed in a vehicle-forward direction from the display screen. The airbag may extend rearward past the display screen when the airbag is in the partially inflated position.

The airbag may contact the display screen when the airbag is in the fully inflated position.

The maximum length of the band may be at least 25% longer than an unstretched length of the band.

The band may be an elastic material.

The airbag may include a loop through which the band extends. The loop may be on the rear panel.

The airbag may include two side panels each extending from the rear panel to the housing and facing in a horizontal direction, and the airbag may include a loop on one of the rear panel or side panels and through which the band extends.

The airbag may include a top panel extending from the rear panel to the housing and facing upward, and a bottom panel extending from the rear panel to the housing and facing downward, and the band may be spaced from the top panel and bottom panel when the airbag is in the partially inflated position.

The housing may include a first bracket at which the first end of the band is attached and a second bracket at which the second end of the band is attached, and the first bracket may be positioned horizontally from the second bracket. The band may be a first band, and the restraint system may further include a second band elongated from the first bracket to the second bracket. The second band may extend across the rear panel and may be stretched to a maximum length when the airbag is in the partially inflated position. When the airbag is in the partially inflated position, a portion of the first band crossing the rear panel may be spaced from a portion of the second band crossing the rear panel.

The airbag may be a front passenger airbag.

With reference to the Figures, a restraint system 32 for a vehicle 30 includes a housing 34, an airbag 36, and a first band 38. The airbag 36 is inflatable from an uninflated position in the housing 34 to a fully inflated position extending from the housing 34, and the airbag 36 has a rear panel 40 spaced from the housing 34 when the airbag 36 is in the fully inflated position. The first band 38 is elongated from a first end 42 to a second end 44, and the first and second ends 42, 44 are attached to the housing 34. When the airbag 36 is in a partially inflated position, the first band 38 extends across the rear panel 40 and is stretched to a maximum length.

The restraint system 32 provides a way to package the airbag 36 so as to not catch on an obstruction such as a display screen 46 during inflation. The first band 38 (possibly along with a second band 48, described below) guides the airbag 36 during inflation so that the airbag 36 expands more in directions that are unlikely to catch on the obstruction and less in directions that could catch on the obstruction during a first phase of inflation. The bands 38, 48 break when the airbag 36 is in the partially inflated position, allowing the airbag 36 to inflate to the fully inflated position unconstrained through a second phase of inflation.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a passenger cabin 50 to house occupants, if any, of the vehicle 30. The passenger cabin 50 includes a driver seat 52 and a passenger seat 54 disposed at a front of the passenger cabin 50 and one or more back seats 56 disposed behind the driver and passenger seats 52, 54. The passenger cabin 50 may also include third-row seats (not shown) at a rear of the passenger cabin 50. In FIG. 1, the front seat is shown to be a bucket seat, but the seats 52, 54, 56 may be other types. The position and orientation of the seats 52, 54, 56 and components thereof may be adjustable by an occupant.

An instrument panel 58 is disposed at a forward end of the passenger cabin 50 and faces toward the driver and passenger seats 52, 54. The instrument panel 58 may include vehicle controls, such as a steering wheel 60; gauges, dials, and information displays; heating and ventilation equipment; a radio and other electronics; etc.

The display screen 46 is mounted to the instrument panel 58. The display screen 46 extends upward from the instrument panel 58 and is positioned along a centerline of the vehicle 30. The display screen 46 is between the driver seat 52 and the passenger seat 54 in a cross-vehicle direction. The display screen 46 can display visual information to occupants in the passenger cabin 50. For example, the display screen 46 can be a light-emitting diode (LED) screen, an electroluminescent display (ELD) screen, plasma display panel (PDP) screen, liquid crystal display (LCD) screen, organic light-emitting diode (OLED) screen, etc. The display screen 46 can be a touchscreen, i.e., accepting input from one of the occupants touching the display screen 46. The display screen 46 may be fixed relative to the instrument panel 58, or the display screen 46 may be adjustable relative to the instrument panel 58 or retractable into the instrument panel 58.

The housing 34 is disposed in the instrument panel 58. The housing 34 can be concealed under an exterior surface of the instrument panel 58. The housing 34 is disposed in a vehicle-forward direction from the display screen 46 and is disposed outboard of the display screen 46. The housing 34 is disposed in a vehicle-forward direction from the passenger seat 54 and in an opposite side of the instrument panel 58 than the side of the instrument panel 58 to which the steering wheel 60 is coupled.

Figure 2:
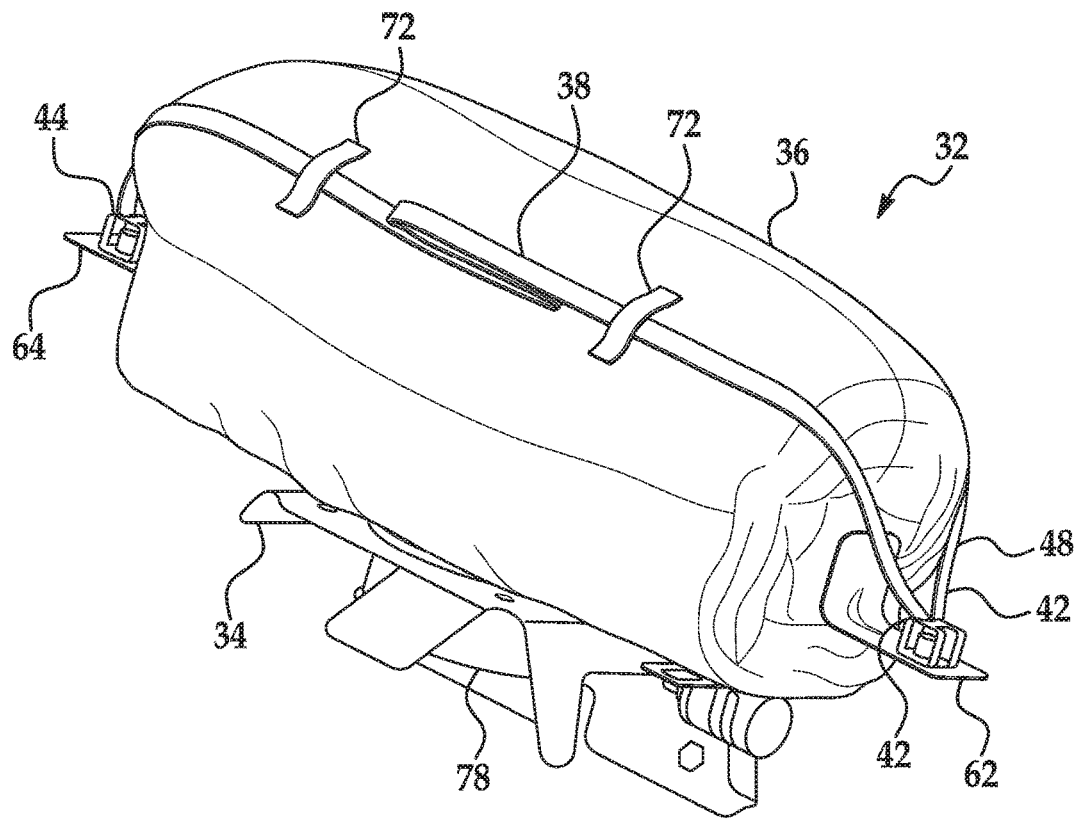
FIG. 2 is a top view of a housing with an airbag in an uninflated position.

With reference to FIG. 2, the housing 34 extends at least partially around the airbag 36 in the uninflated position. The housing 34 extends underneath, to the left of, and to the right of the airbag 36 in the uninflated position.

The housing 34 includes a first bracket 62 and a second bracket 64. The first bracket 62 is positioned horizontally from the second bracket 64; i.e., the first bracket 62 and the second bracket 64 are positioned at the same height, using a reference frame of the vehicle 30. The first bracket 62 and the second bracket 64 are positioned along a common cross-vehicle axis; i.e., the first bracket 62 is directly inboard or outboard of the second bracket 64.

Figure 3A:
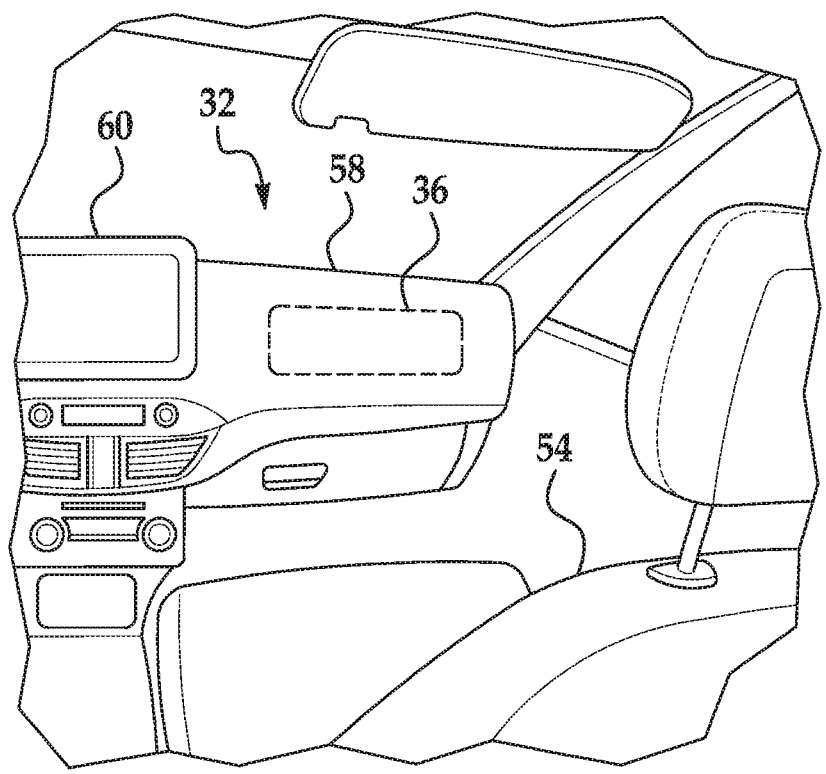
FIG. 3A is a perspective view of an instrument panel with the airbag in the uninflated position.

With reference to FIGS. 3A-5B, the airbag 36 is a front passenger airbag. The airbag 36 is inflatable from the uninflated position to the partially inflated position to the fully inflated position. In the uninflated position, the airbag 36 is in the housing 34 and is concealed by the instrument panel 58, as shown in FIG. 3A. In the partially inflated position, the airbag 36 extends from the instrument panel 58 rearward toward the passenger seat 54 and is at less than a maximum volume of inflation, as shown in FIGS. 3B, 4A, and 5A. In the partially inflated position, the airbag 36 extends rearward past the display screen 46. In the fully inflated position, the airbag 36 extends farther rearward from the instrument panel 58 than in the partially inflated position, and the airbag 36 is at the maximum volume of inflation. In the fully inflated position, the airbag 36 contacts the display screen 46.

The airbag 36 may be formed of any suitable airbag material, for example, a woven polymer. For example, the airbag 36 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The airbag 36 includes the rear panel 40, two side panels 66, a top panel 68, and a bottom panel 70. When the airbag 36 is in the fully inflated position or partially inflated position, the rear panel 40 faces toward the passenger seat 54 and is the rearmost portion of the airbag 36. When the airbag 36 is in the fully inflated position or partially inflated position, the rear panel 40 is spaced from the housing 34 and from the instrument panel 58, i.e., the rear panel 40 is not contacting the housing 34 or the instrument panel 58. When the airbag 36 is in the fully inflated position or partially inflated position, the side panels 66 each extend from the rear panel 40 to the housing 34 and face in a horizontal direction, e.g., left or right; the top panel 68 extends from the rear panel 40 to the housing 34 and faces upward; and the bottom panel 70 extends from the rear panel 40 to the housing 34 and faces downward.

The airbag 36 includes at least one loop 72 on the rear panel 40 and/or the side panels 66. For example, the airbag 36 can include four loops 72 on the rear panel 40, as shown in the Figures. Alternatively, the airbag 36 can include a different number of loops 72 on the rear panel 40 only, the airbag 36 can include a plurality of loops 72 on the rear panel 40 and on the side panels 66, or the airbag 36 can include a plurality of loops 72 on the side panels 66 only. The loops 72 are attached to an exterior surface of the airbag 36. The loops 72 can be, e.g., fabric sewn to the airbag 36 at two ends, permitting something to be threaded between the loop 72 and the exterior surface of the airbag 36. The fabric of the loops 72 can be the same fabric as the rest of the airbag 36.

Returning to FIG. 2, the first band 38 is elongated from the first end 42 to the second end 44. The restraint system 32 can include the second band 48, also elongated from the first end 42 to the second end 44. The first ends 42 of the bands 38, 48 are attached to the housing 34, e.g., at the first bracket 62, and the second ends 44 of the bands 38, 48 are attached to the housing 34, e.g., at the second bracket 64. The bands 38, 48 extend through the loops 72. The bands 38, 48 extend through mutually exclusive sets of loops 72; i.e., the first band 38 does not extend through any loops 72 that the second band 48 extends through, and vice versa.

The bands 38, 48 are stretchable from an unstretched length to a maximum length. For the purposes of this disclosure, "stretchable" is defined as deformable under stress by a significant proportion of an object's size without yielding, i.e., breaking. The material of the airbag 36 is not stretchable, and the bands 38, 48 are significantly more stretchable than the airbag 36. For example, the bands 38, 48 can be an elastic material, e.g., natural rubber, synthetic rubber, nitrile rubber, silicone rubber, urethane rubbers, chloroprene rubber, Ethylene Vinyl Acetate (EVA rubber), etc. Elastic materials can elastically deform under stress by a significant proportion of their size while being able to return to their original size. For example, the maximum length of each band 38, 48 (i.e., a longest length before the band yields 38, 48) is at least 25% longer, e.g., approximately 50% longer, than the unstretched length of the band 38, 48.

Figure 3B:
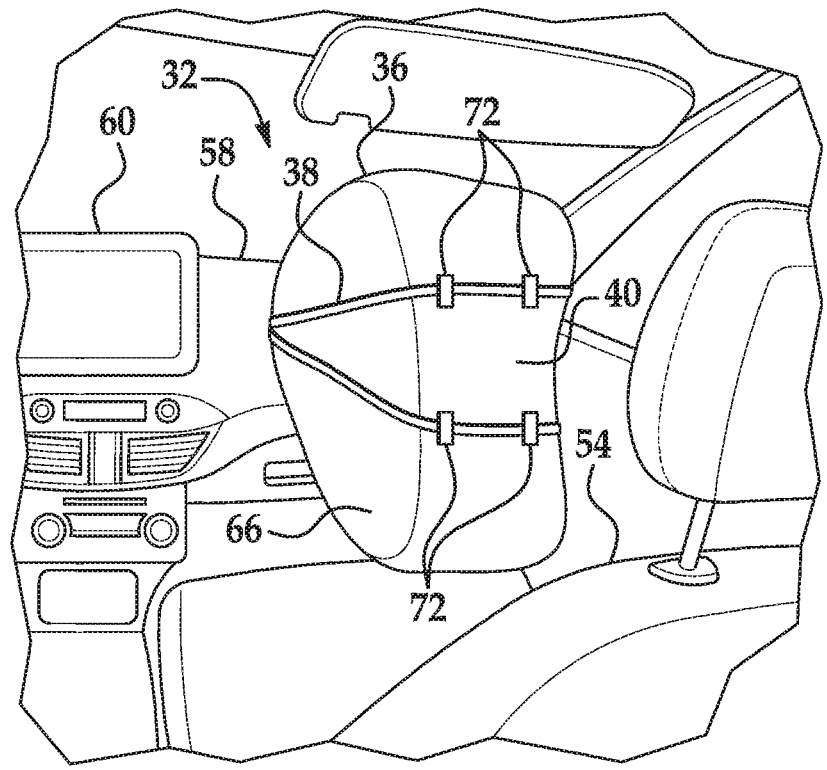
FIG. 3B is a perspective view of the instrument panel with the airbag in a partially inflated position.
Figure 3C:
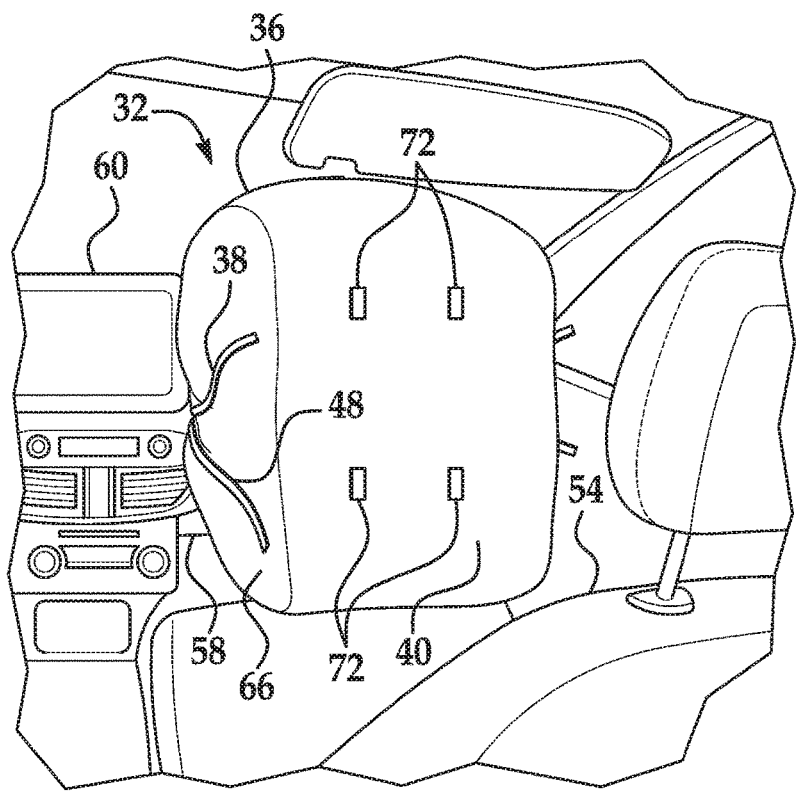
FIG. 3C is a perspective view of the instrument panel with the airbag in a fully inflated position.
Figure 4A:
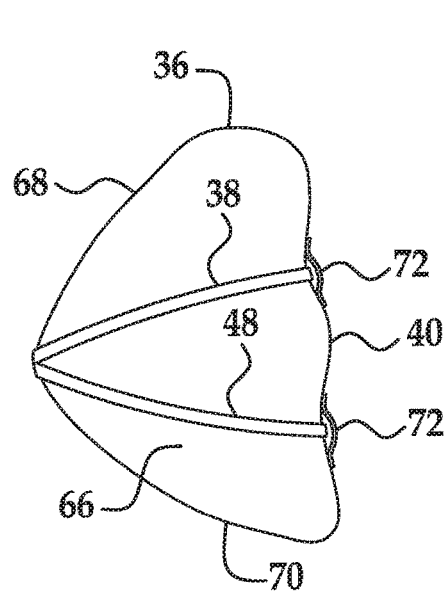
FIG. 4A is a side view of the airbag in the partially inflated position.
Figure 4B:
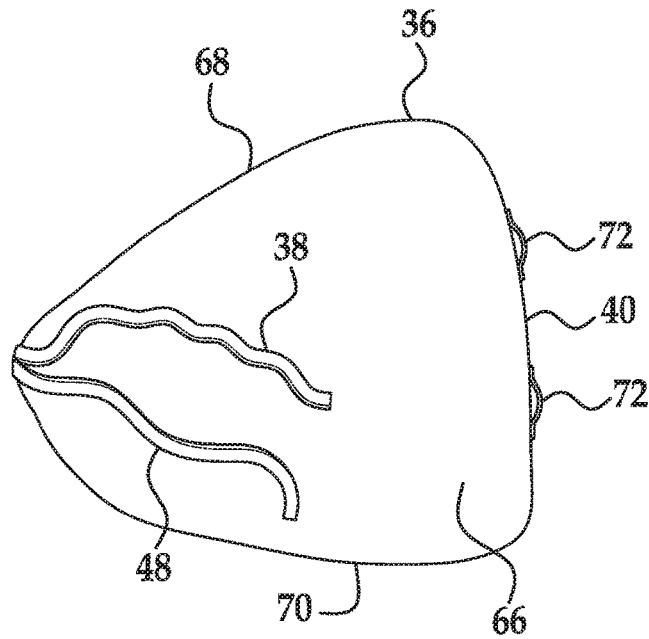
FIG. 4B is a side view of the airbag in the fully inflated position.
Figure 5A:
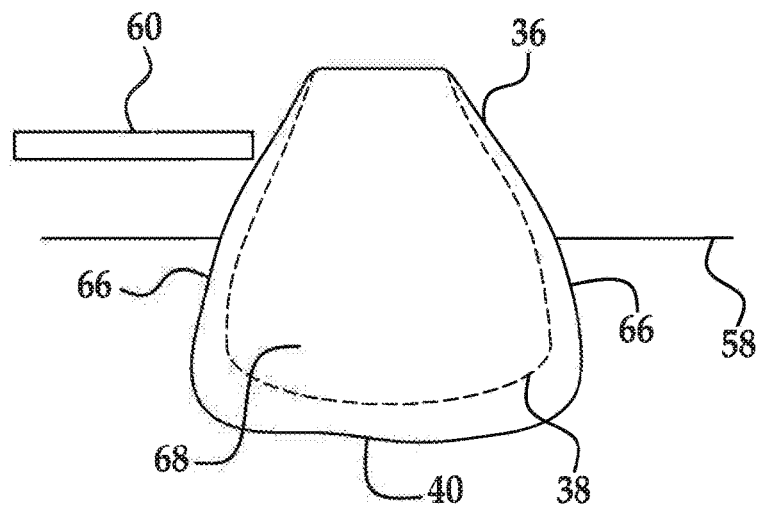
FIG. 5A is a top view of the instrument panel with the airbag in the partially inflated position.
Figure 5B:
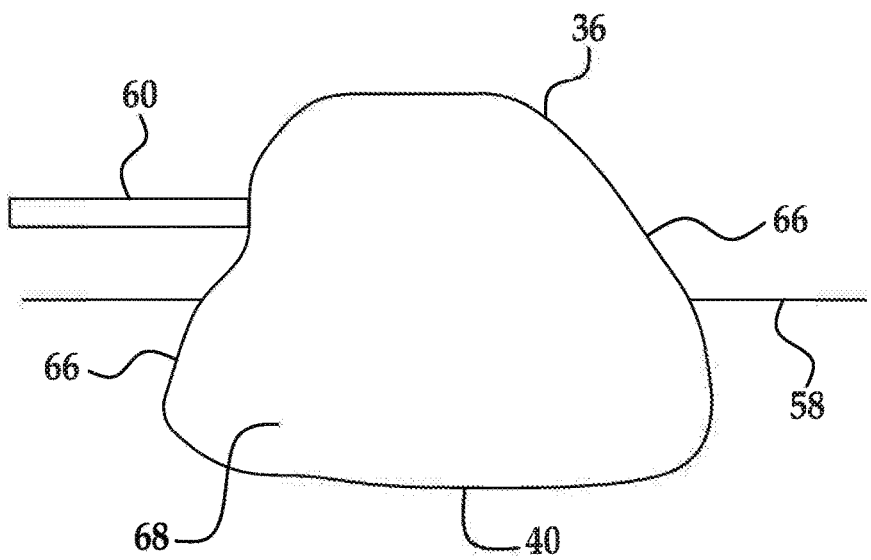
FIG. 5B is a top view of the instrument panel with the airbag in the fully inflated position.

When the airbag 36 is in the uninflated position, the bands 38, 48 are at the unstretched length and are folded on top of or next to the airbag 36, as shown in FIG. 2, and the instrument panel 58 conceals the bands 38, 48 along with the airbag 36. During inflation, the airbag 36 stretches the bands 38, 48 longer than their maximum lengths, causing the bands 38, 48 to yield, i.e., break. In other words, a tensile force exerted on the first band 38 from inflation of the airbag 36 is greater than a yield force (i.e., force at which an object yields) of the first band 38, and a tensile force exerted on the second band 48 from inflation of the airbag 36 is greater than a yield force of the second band 48. When the airbag 36 is in the partially inflated position, as shown in FIGS. 3B, 4A, and 5A, the first band 38 and the second band 48 are stretched to their respective maximum lengths. When the airbag 36 is in the partially inflated position, the bands 38, 48 extend across the rear panel 40 and are spaced from the top panel 68 and from the bottom panel 70, and the portion of the first band 38 crossing the rear panel 40 is spaced from the portion of the second band 48 crossing the rear panel 40, e.g., because of the location of the loops 72. When the airbag 36 is in the fully inflated position, the bands 38, 48 will have broken by being stretched beyond their maximum lengths, as shown in FIGS. 3C, 4B, and 5B.

Figure 6:
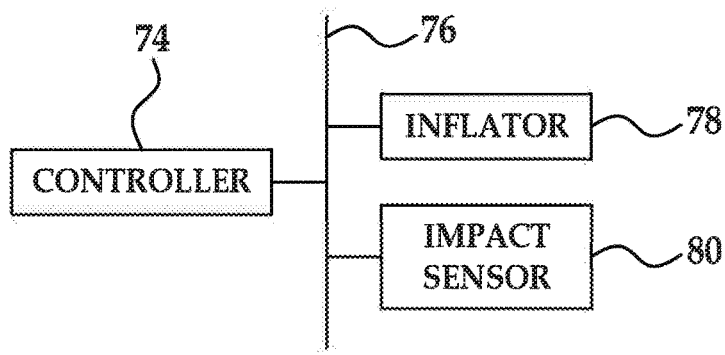
FIG. 6 is a block diagram of a control system for the airbag.

With reference to FIG. 6, a controller 74 is a microprocessor-based controller. The controller 74 includes a processor, a memory, etc. The memory of the controller 74 includes media for storing instructions executable by the processor as well as for electronically storing data and/or databases. The controller 74 may be, e.g., a restraint control module.

The controller 74 may transmit and receive data through a communications network 76 such as a controller area network (CAN) bus, Ethernet, WiFi, Local Interconnect Network (LIN), onboard diagnostics connector (OBD-II), and/or by any other wired or wireless communications network. The controller 74 may be communicatively coupled to an inflator 78 for the airbag 36, to an impact sensor 80, and to other components via the communications network 76.

The inflator 78 is fluidly coupled to the airbag 36. Upon receiving a signal from the controller 74 via the communications network 76, the inflator 78 inflates the airbag 36 with an inflation medium, such as a gas. The inflator 78 may be, for example, a pyrotechnic inflator that uses a chemical reaction to drive inflation medium to the airbag 36. The inflator 78 may be of any suitable type, for example, a cold-gas inflator. The inflator 78 is mounted to the housing 34, as shown in FIG. 2.

The impact sensor 80 is adapted to detect an impact to the vehicle 30. The impact sensor 80 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 80 may be located at numerous points in or on the vehicle 30.

In the event of an impact to the vehicle 30, the impact sensor 80 may detect the impact and transmit a signal through the communications network 76 to the controller 74. The controller 74 may transmit a signal through the communications network 76 to the inflator 78. The inflator 78 may discharge and inflate the airbag 36. As the airbag 36 inflates from the uninflated position to the partially inflated position, the bands 38, 48 compress the airbag 36 so that the airbag 36 expands more vertically and less horizontally than the airbag 36 would expand without the bands 38, 48, and the airbag 36 does not catch on the display screen 46. As the airbag 36 inflates beyond the partially inflated position, the force of the inflation of the airbag 36 breaks the bands 38, 48, and the airbag 36 expands horizontally unconstrained by the bands 38, 48, to the fully inflated position. In the fully inflated position, the airbag 36 can cushion an occupant of the passenger seat 54 during the impact.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
   a housing;
   an airbag inflatable from an uninflated position in the housing to a fully inflated position extending from the housing, the airbag having a rear panel spaced from the housing when the airbag is in the fully inflated position; and
   a stretchable band elongated from a first end to a second end, the first and second ends attached to the housing;
   wherein when the airbag is in a partially inflated position, the band extends across an exterior surface of the rear panel and is stretched to a maximum length;
   the airbag includes a top panel extending from the rear panel to the housing and facing upward, and a bottom panel extending from the rear panel to the housing and facing downward; and
   the band is spaced from the top panel and bottom panel when the airbag is in the partially inflated position.

2. The restraint system of claim 1, wherein a tensile force exerted on the band from inflation of the airbag to the fully inflated position is greater than a yield force of the band.

3. The restraint system of claim 1, further comprising an instrument panel in which the housing is disposed.

4. The restraint system of claim 3, further comprising a display screen extending upward from the instrument panel, wherein the housing is disposed in a vehicle-forward direction from the display screen.

5. The restraint system of claim 4, wherein the airbag extends rearward past the display screen when the airbag is in the partially inflated position.

6. The restraint system of claim 4, wherein the airbag contacts the display screen when the airbag is in the fully inflated position.

7. The restraint system of claim 1, wherein the maximum length of the band is at least 25% longer than an unstretched length of the band.

8. The restraint system of claim 1, wherein the band is an elastic material.

9. The restraint system of claim 1, wherein the airbag includes a loop through which the band extends.

10. The restraint system of claim 9, wherein the loop is on the rear panel.

11. The restraint system of claim 9, wherein
    the airbag includes two side panels each extending from the rear panel to the housing and facing in a horizontal direction; and
    the airbag includes a loop on one of the rear panel or side panels and through which the band extends.

12. The restraint system of claim 1, wherein
    the housing includes a first bracket at which the first end of the band is attached and a second bracket at which the second end of the band is attached; and
    the first bracket is positioned horizontally from the second bracket.

13. The restraint system of claim 12, wherein the band is a first band, the restraint system further comprising a second band elongated from the first bracket to the second bracket.

14. The restraint system of claim 13, wherein the second band extends across the rear panel and is stretched to a maximum length when the airbag is in the partially inflated position.

15. The restraint system of claim 14, wherein when the airbag is in the partially inflated position, a portion of the first band crossing the rear panel is spaced from a portion of the second band crossing the rear panel.

16. The restraint system of claim 1, wherein the airbag is a front passenger airbag.

17. The restraint system of claim 1, wherein the airbag includes two side panels each extending from the rear panel to the housing and facing in a horizontal direction, and when the airbag is in the partially inflated position, the band extends across exterior surfaces of the side panels.

18. The restraint system of claim 1, wherein the band extends outside the airbag from the first end to the second end.

19. A restraint system comprising:
a housing;
an airbag inflatable from an uninflated position in the housing to a fully inflated position extending from the housing, the airbag having a rear panel spaced from the housing when the airbag is in the fully inflated position; and
a stretchable band elongated from a first end to a second end, the first and second ends attached to the housing;
wherein when the airbag is in a partially inflated position, the band extends across an exterior surface of the rear panel and is stretched to a maximum length;

the housing includes a first bracket at which the first end of the band is attached and a second bracket at which the second end of the band is attached; and
the first bracket is positioned horizontally from the second bracket.

20. A restraint system comprising:
a housing;
an airbag inflatable from an uninflated position in the housing to a fully inflated position extending from the housing, the airbag having a rear panel spaced from the housing when the airbag is in the fully inflated position; and
a stretchable band elongated from a first end to a second end, the first and second ends attached to the housing;
wherein when the airbag is in a partially inflated position, the band extends across an exterior surface of the rear panel and is stretched to a maximum length; and
the airbag includes two side panels each extending from the rear panel to the housing and facing in a horizontal direction, and when the airbag is in the partially inflated position, the band extends across exterior surfaces of the side panels.

* * * * *